United States Patent [19]

Shim

[11] 3,725,481
[45] Apr. 3, 1973

[54] OLIGOMER COMPOSITION FROM ALKYL AMINE AND SULFUR CHLORIDES
[75] Inventor: Kyung S. Shim, Dobbs Ferry, N.Y.
[73] Assignee: Stauffer Chemical Company, New York, N.Y.
[22] Filed: Mar. 3, 1971
[21] Appl. No.: 120,731

Related U.S. Application Data
[63] Continuation of Ser. No. 800,711, Feb. 19, 1969, abandoned.

[52] U.S. Cl. ........260/583 EE, 260/79.5 B, 260/795, 260/798
[51] Int. Cl. ..................C08f 27/06, C07c 85/00
[58] Field of Search.........260/79, 79.5 B, 795, 798, 583 260/EE

[56] References Cited

UNITED STATES PATENTS 2,649,470  8/1953  Harman..............................260/464
3,040,098  6/1962  Stone...............................260/583 EE
3,595,919  7/1971  Shim...............................260/583 EE Primary Examiner—James A. Seidleck
Assistant Examiner—C. A. Henderson, Jr.
Attorney—Robert C. Sullivan, Daniel C. Block and Paul F. Juettnu

[57] ABSTRACT

An oligomer vulcanizing agent and products made therefrom are described herein. The oligomer composition has the following formula:

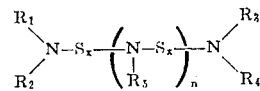

wherein $R_1$, $R_2$, $R_3$, $R_4$ and $R_5$ can each be selected from the lower alkyl group having one to 10 carbon atoms and $x$ can range between 1 and 7, and $n$ can range between 0.5 and 15.

3 Claims, No Drawings

OLIGOMER COMPOSITION FROM ALKYL AMINE AND SULFUR CHLORIDES

This application is a continuation of Ser. No. 800,711 filed on Feb. 19, 1969, now abandoned.

BACKGROUND OF THE INVENTION

In the art of vulcanizing rubber compositions, it is the practice to admix the particular rubber material with additive compounds such as process oils, organic acids and zinc oxide. These rubber materials can be selected from any number of compositions useful in a vulcanizing process, such as, natural rubber or synthetic rubbers. The synthetic rubbers can be described as the alpha-olefin hydrocarbons such as ethylene/propylene copolymers, ethylene/butylene copolymers, ethylene/propylene/diene terpolymers, ethylene/1-butene/diene terpolymers, stryene/butadiene copolymers, styrene/butadiene neoprene. After these materials are thoroughly intermixed together, a vulcanizing agent is added thereto. The combination of ingredients are then heated in a conventional apparatus and vulcanized into useful products.

The most commonly used vulcanizing agent within these formulations is free sulfur. However, when using sulfur to vulcanize the rubber materials, a noxious odor is given off when the rubber material is finally cured, which is objectionable. Moreover, the end product is too scorchy during the curing thereof. Also, blooming problems are encountered. In order to overcome these problems, amino compositions containing a substantial amount of sulfur were formulated and used in lieu of the free sulfur. However, these materials have not been notably successful because the rubber formulation will have either too high or too low a viscosity or too scorchy or will have a high reversion rate along with a long curing rate or have poor blooming properties.

BRIEF DESCRIPTION OF THE INVENTION

It has been discovered that an oligomer vulcanizing agent composition can be used successfully to vulcanize rubber compositions into useful products. The oligomer composition has the following formula:

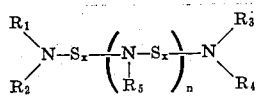

wherein $R_1$, $R_2$, $R_3$, $R_4$ and $R_5$ can each be selected from the lower alkyl groups containing from one to 10 carbon atoms, and $x$ can range between 1 and 7, and $n$ can range between 0.5 and 15. The rubber formulations vulcanized with this oligomer vulcanizing agent has excellent minimum and maximum viscosities along with excellent blooming properties and cure and reversion rates.

DETAILED DESCRIPTION OF THE INVENTION

In the practice of the present invention, the oligomer vulcanizing agent of the present invention is manufactured by first intermixing a primary alkyl amine and a secondary alkyl amine in a water, alkali hydroxide and organic solvent. This combination of materials is thoroughly mixed together and maintained under agitation conditions while being cooled in an ice bath. While this combination of materials is thoroughly stirred, a sulfur chloride material is slowly added over a period of from about 0.25 to about 2 hours while maintaining the reaction temperature at between about 0° and 50° C. After additional stirring, the mixture is then cooled to room temperature. When the reaction temperature is cooled to room temperature, an organic layer will form which is separated, washed and dried over anhydrous drying material to remove all the water. The product is a yellow oily material.

The primary alkyl amine useful in the present invention can be the lower alkyl amines having from one to 10 carbon atoms. Exemplary of the primary alkyl amines useful with the present invention are methylamine, ethylamine, propylamine, isopropylamine, butylamine, isobutylamine, tertiary butylamine, pentylamine, hexylamine and mixtures thereof. The secondary alkyl amines useful with the present invention are those with alkyl groups which contain from one to 10 carbon atoms. Exemplary secondary amines are dimethylamine, diethylamine, dipropylamine, di-isopropylamine, dibutylamine, di-isobutylamine, di-tertiary butylamine, dipentylamine, dihexylamine and mixtures thereof. The alkali hydroxide is preferably selected from the sodium and potassium alkali metal hydroxides, although alkali carbonates such as sodium carbonate can be used. The organic solvent can be selected from the group consisting of hexane, pentane, ether, chloroform, carbon tetrachloride and the like. The sulfur chloride can be sulfur monochloride, sulfur dichloride, dichlorotrisulfane, dichlorotetrasulfane as represented by the formula $S_xCl_2$ where $x$ can range between 1 and 7.

The product formed in an oligomer having the following formula:

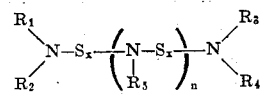

wherein $R_1$, $R_2$, $R_3$, $R_4$ and $R_5$ can each be a lower alkyl having from one to 10 carbon atoms and wherein the average numerical value for $x$ will range between 1 and 7, preferably around 2 to 5 and $n$ can range between 0.5 and 15. The average numerical values for $x$ and $n$ will, of course, depend on the amount of ingredients that are used in the initial reaction. Thus, up to about 15 moles of the primary amine can be reacted with at least 2 moles of the secondary amines and up to 16 moles of sulfur chloride material can be employed. Thus, the formulator can select the average number of $x$ and $n$ for the end result desired.

The oligomer composition in the present invention can then be used in vulcanizing rubber compositions. Thus, the oligomer composition can be intermixed with natural rubbers or the synthetic rubbers in an amount ranging between 0.5 to about 10 parts per 100 parts of the rubber composition. Typical synthetic rubbers includes styrene-butadiene, polybutadiene, polyisoprene, acrylonitrile-butadiene, ethylene-propylene-diolefin, isobutylene-isoprene, polychloroprene and the like. After the oligomer vulcanizing agent has been added thereto, the rubber composition is fully cured in a conventional manner.

The following examples illustrate the merits of the present invention:

EXAMPLE 1

In a 2-liter flask, equipped with a stirrer, thermometer and dropping funnel, was placed 800 milliliters of water, 200 milliliters of hexane, 1 mole of dimethylamine, 1 mole of tertiary butylamine, and 4 moles of sodium hydroxide. The material was cooled in an ice bath. To the stirring solution was added 2 moles of sulfur monochloride dropwise over a period of 1 hour while maintaining the reaction temperature at between 15° and 30° C. After the reaction mixture had cooled to room temperature, it was stirred for an additional hour. An organic layer was separated, washed with water, and dried over anhydrous magnesium sulfate. The solvent was removed on a rotary evaporator to give a yellow oily material. In order to remove all other volatile materials which may be present within the mixture, the yellow oily material was subjected to reduced pressure at 0.02 millimeters at room temperature to give 65.5 grams of the yellow oil. Analysis of this material indicated the presence of 57.3 percent sulfur.

EXAMPLE 2

This example describes the use of the oligomer composition of Example 1 as a curing agent for commercial rubber compositions. Thus, a master batch was prepared by mixing 40 parts of carbon black, 4 parts zinc oxide, 2 parts stearic acid, 1 part antioxidant, and 1 part benzothiazole disulfide with each 100 parts of natural rubber. Portions of this material were then used to prepare two different stocks. Thus, 2.5 parts of free sulfur was added to the first stock and 1.8 parts of the curing agent of Example 1 was added to the second stock. Each of the stocks were then cured in the conventional manner with the following results:

TABLE I

| | 1st Stock | 2nd Stock |
|---|---|---|
| Rotating Disc Viscometer; Small Rotor, 250°F | | |
| Minutes to 5 point rise | 23 | 23 |
| Small Rotor, 270°F | | |
| Minutes to 5 point rise | 12 | 13 |
| Oscillating Disc Rheograph; 320°F, 900 cpm | | |
| Minimum Viscosity, in-lbs | 19 | 19 |
| Maximum Viscosity, in-lbs | 62 | 61 |
| Minutes to 1 in-lb increase | 3.4 | 4.1 |
| Minutes to 90% max. viscosity | 6.1 | 8.3 |
| Minutes to 2 lb decrease | 13 | 59 |
| Cure Rate, in-lbs/minute | 14 | 9 |
| Reversion Rate, in-lbs/minute | 0.14 | 0.06 |

EXAMPLE 3

This example describes the use of the curing agent of Example 1 for commercial styrene/butadiene rubber compositions. Thus, 40 parts carbon black, 16 parts napthenic process oil, 4 parts zinc oxide, 2 parts stearic acid, 1 part antioxidant, 1.5 parts mercaptobenzothiazole were blended with 100 parts styrene butadiene rubber. Portions of this material were then used to prepare stocks. Thus, 2 parts of free sulfur was added to the first portion and 2.75 parts of the curing agent of Example 1 was added to the second portion. These stocks were then cured in a conventional manner and the following data resulted:

TABLE II

| | 1st Stock | 2nd Stock |
|---|---|---|
| Rotating Disc Viscometer; | | |
| Small Rotor, 250°F | | |
| Minutes to 5 point rise | 36 | 17 |
| Small Rotor Rotor, 270°F | | |
| Minutes to 5 point rise | 19 | 11 |
| Oscillating Disc Rheograph; 320°F, 900 cpm | | |
| Minimum Viscosity, in-lbs | 20 | 19 |
| Maximum Viscosity, in-lbs | 60 | 71 |
| Minutes to 1 in-lb increase | 4.3 | 3.7 |
| Minutes to 90% max, viscosity | 14 | 10 |
| Cure Rate, in-lbs/minute | 4.4 | 7.1 |

EXAMPLE 4

In a two liter flask, equipped with a stirrer, thermometer and dropping funnel, was placed 300 milliliters of water, 150 milliliters of hexane, 0.5 mole of dibutylamine, 0.5 mole of tertiary butylamine, and 2.2 moles of sodium hydroxide. The material was cooled in an ice bath. To the stirring solution was added 1 mole of sulfur monochloride dropwise over a period of 1 hour while maintaining the reaction temperature at between 15° and 30° C. After the reaction mixture had cooled to room temperature, it was stirred for an additional hour. An organic layer was separated, washed with water, and dried over anhydrous magnesium sulfate. The solvent was removed on a rotary evaporator to give a yellow oily material. In order to remove all other volatile materials which may be present within the mixture, the yellow oily material was subjected to reduced pressure at 0.01 millimeters at room temperature to give 149 grams of the yellow oil. Analysis of this material indicated the presence of 32.43 percent sulfur.

EXAMPLE 5

In a 2-liter flask, equipped with a stirrer, thermometer and dropping funnel, was placed 300 milliliters of water, 150 milliliters of hexane, 0.5 mole of dibutylamine, 1 mole of n-propylamine, and 2.2 moles of sodium hydroxide. The material was cooled in an ice bath. To the stirring solution was added 1 mole of sulfur monochloride dropwise over a period of 1 hour while maintaining the reaction temperature at between 15° and 30° C. After the reaction mixture had cooled to room temperature, it was stirred for an additional hour. An organic layer was separated, washed with water, and dried over anhydrous magnesium sulfate. The solvent was removed on a rotary evaporator to give a yellow oily material. In order to remove all other volatile materials which may be present within the mixture, the yellow oily material was subjected to reduced pressure at 0.02 millimeters at room temperature to give 131.0 grams of the yellow oil.

I claim:

1. An oligomer composition having the following formula:

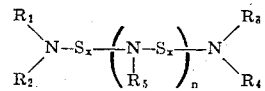

wherein $R_1$, $R_2$, $R_3$ and $R_4$ can each be selected from the lower alkyl group having one to 10 carbon atoms, $R_5$ is tertiarybutyl, $x$ has a value of 2 and $n$ can range between 0.5 to 15.

2. An oligomer composition in accordance with claim 1 wherein the average numerical value for $n$ ranges between 2 and 5.

3. An oligomer composition in accordance with claim 1 wherein $R_1$, $R_2$, $R_3$ and $R_4$ are methyl.

* * * * *